Figure 1:
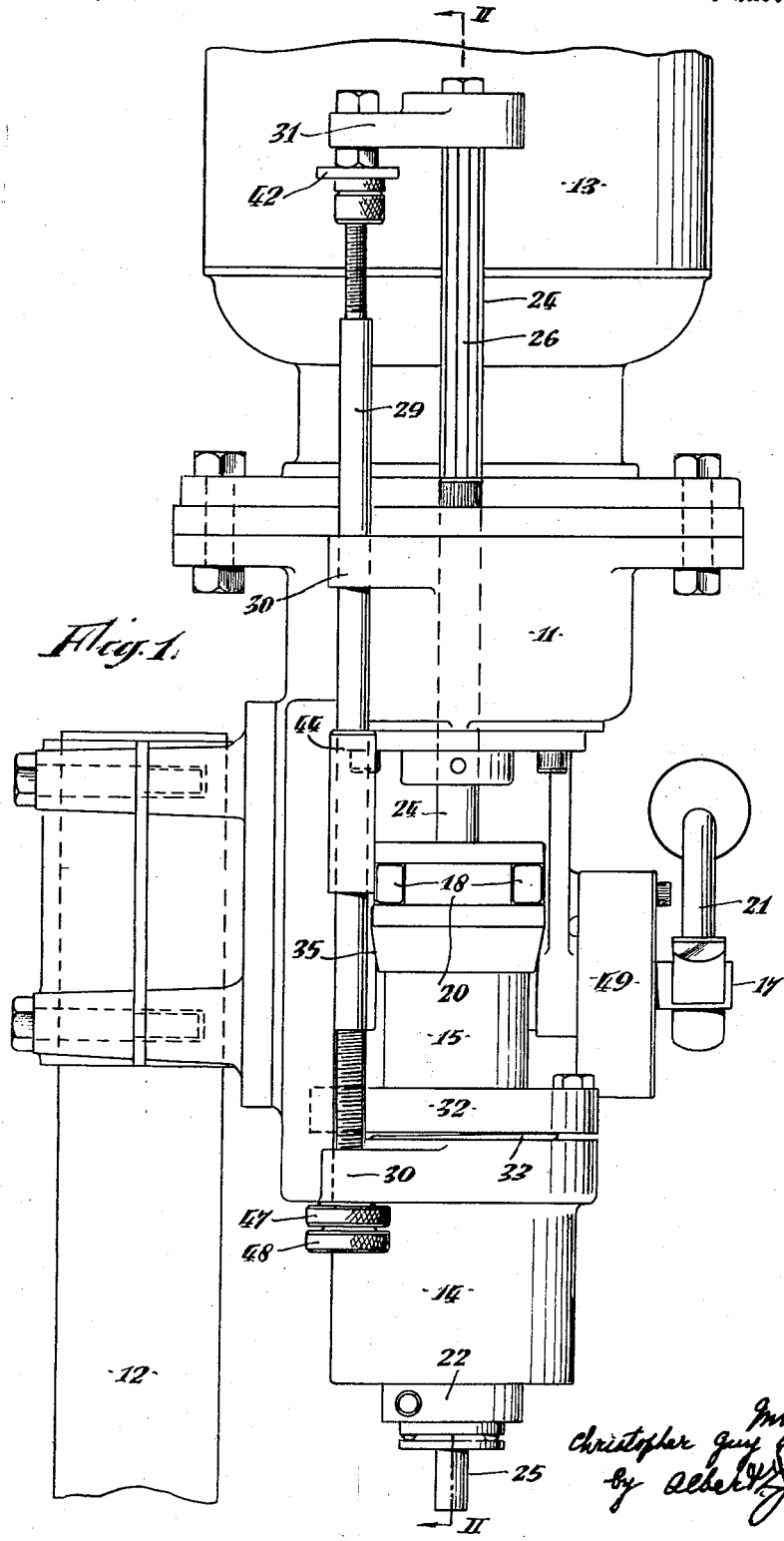

Dec. 19, 1961 — C. G. ARENGO — 3,013,285
LEAD SCREW FEED MEANS WITH MEANS TO CLUTCH FEED NUT
TO ESTABLISH FEED MEANS FOR TOOL SPINDLE
Filed May 5, 1959 — 3 Sheets-Sheet 1

Dec. 19, 1961 C. G. ARENGO 3,013,285
LEAD SCREW FEED MEANS WITH MEANS TO CLUTCH FEED NUT
TO ESTABLISH FEED MEANS FOR TOOL SPINDLE
Filed May 5, 1959 3 Sheets-Sheet 3

Inventor
Christopher Guy Arengo
by Albert F. Jacobs
Attorney

United States Patent Office 3,013,285
Patented Dec. 19, 1961

3,013,285
LEAD SCREW FEED MEANS WITH MEANS TO CLUTCH FEED NUT TO ESTABLISH FEED MEANS FOR TOOL SPINDLE
Christopher Guy Arengo, Bristol, England, assignor of one-half to Bristol Repetition Limited, Bristol, England, a company
Filed May 5, 1959, Ser. No. 811,039
3 Claims. (Cl. 10—139)

This invention relates to tapping machines of the controlled pitch type.

Although such machines are usually referred to as tapping machines, they are in fact adapted to operate with a die for the purpose of cutting an external screw thread on an element, as well as for operating with a tap for cutting an internal screw thread, and in this specification the term "tapping machine" will include a machine for so operating with a die or a tap, and the term "tapping tool" will include a die or a tap.

It is usual in tapping machines for the tapping tool to be advanced to the work from a starting position which is at a comparatively large distance from the work, and for the tool to move up to and through or along the work at a constant controlled speed of feed. This arrangement results in a large amount of time being taken up by the tool advancing towards the work before commencing its operation of tapping the work.

The object of the present invention is to provide an improved tapping machine which will enable the tool to be advanced quickly to the work and thereafter proceed at a controlled speed of feed through or along the work.

A tapping machine according to this invention comprises a drive shaft, means for driving said shaft rotatably, a holder on the drive shaft to carry a tapping tool, a sleeve concentric with and encompassing the drive shaft, said sleeve being movable axially and rotatably in a fixed portion of the frame or housing of the machine, interengaging screw and nut devices on the drive shaft and on said sleeve said screw and nut devices having a pitch equal to the pitch of the tapping tool, means for advancing the drive shaft and the said sleeve axially thereof in the machine frame independently of the rotation drive means, and interengaging friction clutch means on said sleeve and on the machine frame suitably spaced apart axially of the drive shaft when the parts are in the starting position to allow a certain axial movement of the drive shaft from the starting position before said clutch means engage each other to restrain further axial and rotation movement of the sleeve.

There may be trip catch means on the machine to retain the sleeve in the advanced position independent of the means for advancing the drive shaft and the sleeve axially. The means for advancing the drive shaft axially may be manually or power operated. There may be starting, stopping and reversing switches in an electrical circuit for a motor in the drive means, so positioned as to be actuated by engagement with means movable axially with the drive shaft.

Figure 2:
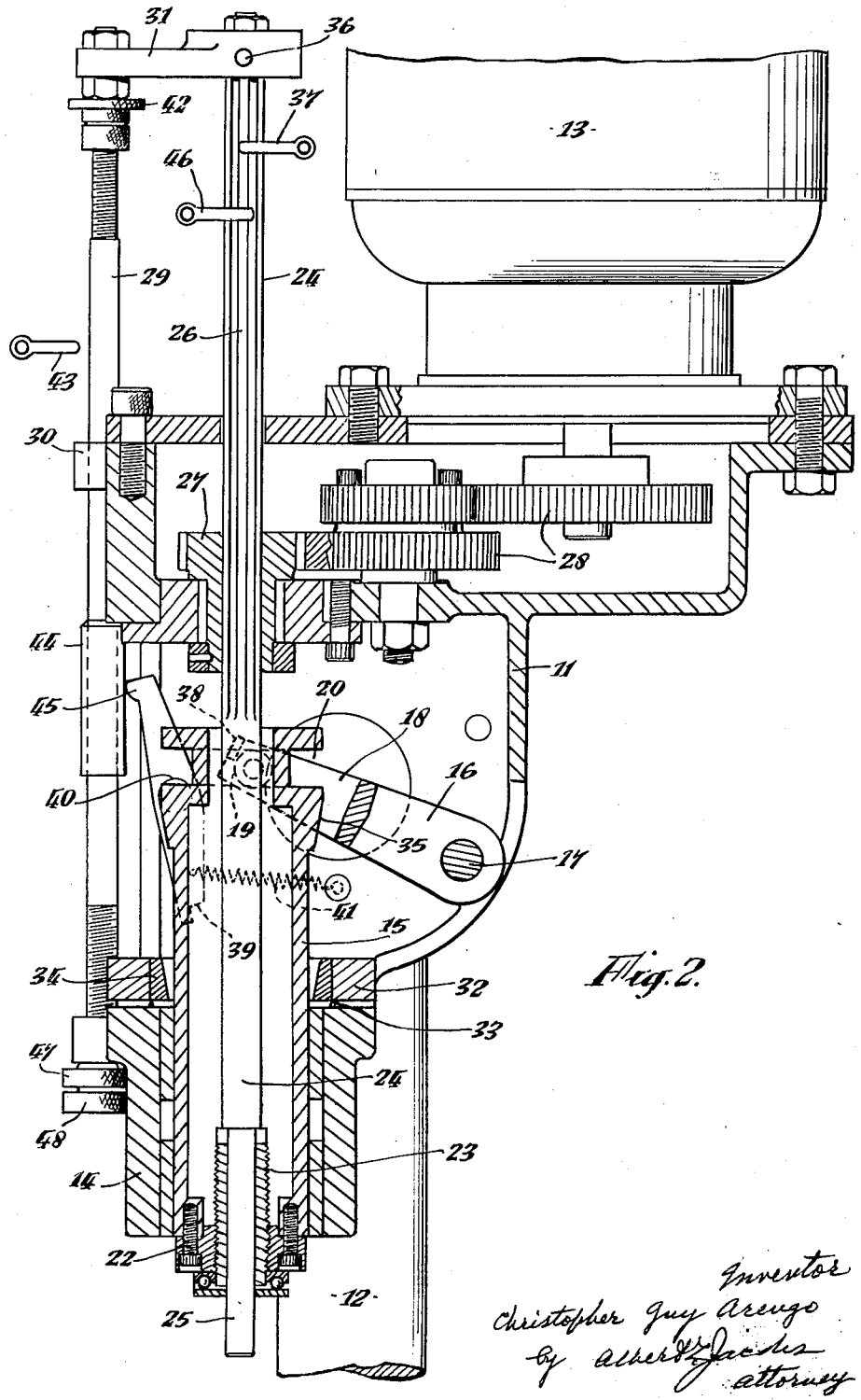
Figure 3:
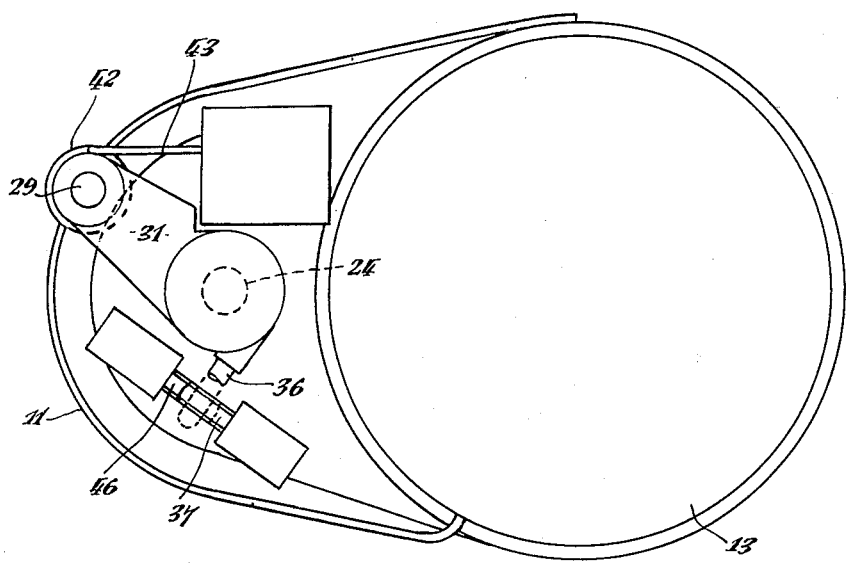
Figure 4:
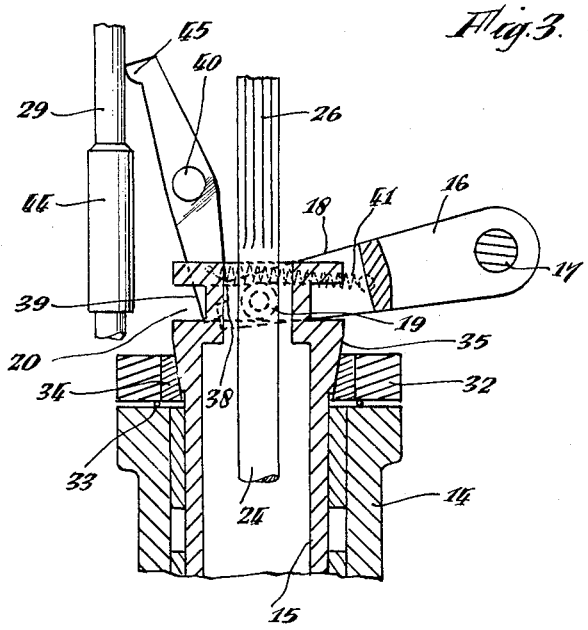

One embodiment of the invention is illustrated in the accompanying drawings, wherein:

FIG. 1 is a front elevation;
FIG. 2 is a sectional elevation, taken on line II—II of FIG. 1;
FIG. 3 is a plan view; and
FIG. 4 is a portion of FIG. 2, showing parts in other positions.

A casing 11 is mounted on a support pillar 12, and a driving motor 13 is mounted on the said casing. A fixed outer sleeve 14 is integral with the casing 11, whilst an inner sleeve 15 is slidable axially in the outer sleeve 14.

An operating lever 16 is mounted on a shaft 17 which is mounted rotatably in the casing 11, and the outer end portion of the said lever is formed as a fork 18 which is provided at its ends with rollers 19 which engage an annular groove 20 around the upper end of the inner sleeve 15. Thereby, upon the lever 16 being pivoted around the axis of the shaft 17, the inner sleeve 15 may be moved axially in and rotate in the outer sleeve 14. The lever 16 may be operated manually by the handle 21 (FIG. 1), or it may be interconnected to some mechanism so as to be actuated in timed relation to said mechanism. A torsion spring, not shown, may be disposed within a chamber 49 fixed to the casing 11, the said spring being adapted to urge the shaft 17 and the lever 16 angularly in opposition to the handle 21 so that the handle is used to depress the sleeve 15 within the sleeve 14 whilst the spring operates to raise the sleeve 15 when the handle 21 is released.

The bottom end of the sleeve 15 is provided with a screw-threaded nut 22, fixed thereto, and a screw 23, secured to a drive shaft 24, engages in said nut. The lower end 25 of the drive shaft 24 is adapted for a tap or die, not shown, to be secured thereto in axial alignment with the shaft. The shaft 24 passes axially up through the sleeve 15, and the upper portion of the shaft is splined at 26 to engage slidable axially in a pinion 27 which is provided with corresponding splines; the pinion 27 is mounted rotatably in the casing 11. The pinion 27 is driven by the motor 13 through a gear train 28.

A rod 29 is disposed parallel to the drive shaft 24 and is slidable axially in lugs 30 which are integral with the casing 11. The upper ends of the rod 29 and shaft 24 are interconnected by a bracket 31 so that both the rod 29 and shaft 24 move axially synchronously, the shaft 24 being rotatable in the bracket 31.

A plate 32 is mounted non-rotatably on the upper end of the fixed sleeve 14, a compression spring 33 being disposed therebetween so that the plate 32 can be moved resiliently slightly in an axial direction. The plate 32 is provided with an internally conical friction bush 34. The upper end of the inner sleeve 15 is conical externally at 35 to correspond with and engage the friction bush 34.

In operation, the sleeve 15 is pressed downwards, that is, towards the work which is to be tapped, by operating the lever 16 by means of the handle 21. By reason of the shaft 24 being attached to the sleeve 15 through the screw 23 and nut 22, the shaft 24 together with the tap or die attached thereto is advanced downwards to the work. Shortly after the commencement of this downward movement of the shaft 24, a pin 36 which projects from the bracket 31 strikes a switch lever 37 of a limit switch and so switches on the motor 13. Thereupon, the shaft 24 and the inner sleeve 15 commence to rotate in the outer sleeve 14, the shaft 24 being driven by the pinion 27. When the shaft 24 and sleeve 15 have been depressed sufficiently for the cone 35 on the sleeve 15 to engage the bush 34 in the non-rotatable plate 32, further rotation of the sleeve 15 will be prevented by the frictional inter-engagement of the said cone 35 and bush 34. The shaft 24 will continue to rotate, and consequently the screw 23 will turn in the nut 22 to cause the tap or die to advance into the work at a speed controlled by the pitch of the threads on the said screw and nut. The advancement of the cone 35 on the sleeve 15 to the bush 34 may be termed the "clearing stroke" and is so arranged that the engagement of the cone 35 with the bush 34 is effected immediately prior to or when the tap or die arrives at the work. Thereby, the tap or die can be advanced up to the work very quickly during this clearing stroke, and subsequently the tap or die operates on the work at the required speed controlled by the screw 23 and nut 22. When the cone 35 engages the bush 34 to restrain rotation of the sleeve 15 a further slight downward pressure of the said sleeve, through the lever 16, will compress the spring 33 and allow a recess 38 on one of the fork arms 18 of the lever 16 to engage a pawl 39 which is mounted pivotally at 40 on the casing 11 and which is urged by a tension spring 41. Thereby, the sleeve 15 is retained in the advanced or depressed position without the handle 21 having to be held down; the handle can be released.

The rod 29 will continue the downward movement with the shaft 24, and when the tap or die reaches the end of its operating stroke, a stop nut 42 on the rod 29 will abut the lever 43 of a switch and thereby cause the motor 13 to be reversed. Thereupon, rotation of the screw 23 in the nut 22 is reversed and the tap or die is raised out of the work, the rising of the shaft 24 and rod 29 continuing. At the moment the tap or die leaves the work, or slightly thereafter, a release sleeve 44, which operates as a trip device and is mounted rigidly on the rod 29, engages the tail 45 of the pawl 39 and releases the pawl from engagement with the recess 38 on the lever 16. Thereupon, the torsion spring acting upon the shaft 17 of the operating lever 16 will cause the shaft 24, rod 29 and the sleeve 15 to be raised quickly to the starting position. As the shaft 24 rises, the pin 36 engages the lever 46 of a switch which cuts the current to the motor 13 and so stops rotation of the said shaft. This completes a cycle of operations. The switch lever 46 moves freely, without actuating its switch when struck by the pin 36 on the downward movement of the shaft 24, and, likewise, the switch lever 37 moves freely when struck by the pin 36 on the upward movement of the shaft.

The pitch of advancement of the tap or die during its working stroke is determined by the screw 23 and nut 22, and a screw and nut of appropriate pitch can be mounted on the shaft 24 and sleeve 15. The moment of actuation of the reversing switch lever 43 is determined by the position of the stop nut 42 on the rod 29 and this position can be adjusted. The upward movement of the shaft 24 and sleeve 15 to the starting position is determined by a stop nut 47, locked by a lock nut 48, on the rod 29 which abuts the bottom lug 30, the position of the nut 47 on the rod 29 being adjustable.

Although in this specification we have referred to the tap or die, the drive shaft, and the inner sleeve moving vertically to advance the tap or die to and withdraw it from the work, obviously such movement may be in any direction, for example, horizontal, according to the position of the work and the machine may be adapted or mounted accordingly.

What I claim and desire to secure by Letters Patent is:

1. A tapping machine comprising a drive shaft, means for driving said shaft rotatably, a holder on the drive shaft to carry a tapping tool, a sleeve concentric with and encompassing the drive shaft, said sleeve being movable axially and rotatably in a fixed portion of the frame-housing of the machine, interengaging screw and nut devices on the drive shaft and on said sleeve, said screw and nut devices having a pitch equal to the pitch of the tapping tool, means for advancing the drive shaft and the said sleeve axially thereof in the machine frame-housing independently of the rotation drive means, and interengaging friction clutch means on said sleeve and on the machine frame-housing suitably spaced apart axially of the drive shaft when the parts are in the starting position to allow a certain axial movement of the drive shaft from the starting position before said clutch means engage each other to restrain further axial and rotational movement of the sleeve, and latching means to retain the sleeve in its advanced position independent of the means for advancing the drive shaft and the sleeve axially, and an abutment movable axially with the drive shaft and positioned relatively to the drive shaft to trip said latching means during retraction movement of the drive shaft when the tapping tool has cleared the work thereby releasing the sleeve and allowing it to be retracted axially with the shaft.

2. A tapping machine according to claim 1, further comprising an electric motor for driving the drive shaft rotatably, switches in an electrical circuit to said motor adapted to effect starting, stopping and reversing of the motor, and actuating means movable axially with the drive shaft, the said switches being so positioned as to be actuated by engagement with said actuating means.

3. A tapping machine according to claim 1, wherein the said means for advancing the drive shaft axially is manually operable.

References Cited in the file of this patent

UNITED STATES PATENTS

| 141,299 | Walworth | July 29, 1873 |
| 916,461 | Lester | Mar. 30, 1909 |
| 2,310,124 | Shartle | Feb. 2, 1943 |
| 2,869,153 | Capek | Jan. 20, 1959 |